United States Patent
Glora et al.

(10) Patent No.: US 7,363,139 B2
(45) Date of Patent: Apr. 22, 2008

(54) METHOD AND DEVICE FOR OPERATING A VEHICLE

(75) Inventors: Michael Glora, Markgroeningen (DE); Michael Brunner, Crailsheim (DE); David Rubia, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 755 days.

(21) Appl. No.: 10/888,417

(22) Filed: Jul. 9, 2004

(65) Prior Publication Data

US 2005/0027428 A1 Feb. 3, 2005

(30) Foreign Application Priority Data

Jul. 23, 2003 (DE) ................. 103 33 440

(51) Int. Cl.
*G06F 19/00* (2006.01)
*F02D 11/00* (2006.01)
*F02D 41/28* (2006.01)

(52) U.S. Cl. .......................... 701/93; 701/36
(58) Field of Classification Search ............. None
See application file for complete search history.

(56) References Cited

U.S. PATENT DOCUMENTS

| | | | | |
|---|---|---|---|---|
| 3,878,915 A | * | 4/1975 | Purland et al. ............. 180/170 |
| 4,375,207 A | * | 3/1983 | Sieber et al. ............... 123/333 |
| 4,615,316 A | * | 10/1986 | Yasuhara ..................... 123/333 |
| 5,070,832 A | * | 12/1991 | Hapka et al. ........... 123/198 D |
| 5,803,043 A | * | 9/1998 | Bayron et al. .............. 123/335 |
| 5,884,210 A | * | 3/1999 | Rettig et al. ................ 701/115 |
| 6,196,196 B1 | | 3/2001 | Gras et al. |
| 6,198,996 B1 | * | 3/2001 | Berstis ........................ 701/36 |
| 7,075,409 B2 | * | 7/2006 | Guba ........................ 340/5.21 |
| 2002/0084887 A1 | * | 7/2002 | Arshad et al. ............. 340/5.61 |
| 2002/0170762 A1 | * | 11/2002 | Daneshmand ............... 180/178 |

FOREIGN PATENT DOCUMENTS

| | | |
|---|---|---|
| DE | 3220083 | 12/1983 |
| DE | 3308803 | 9/1984 |
| DE | 19943068 | 3/2001 |
| FR | 2414123 | 8/1979 |

* cited by examiner

*Primary Examiner*—Michael J. Zanelli
(74) *Attorney, Agent, or Firm*—Kenyon & Kenyon LLP

(57) ABSTRACT

A method and a device for operating a vehicle provide a convenient and flexible function for limiting a performance quantity, in particular the speed or the engine speed of the vehicle. At least one limiting value is predefined for the performance quantity. The at least one limiting value is predefined at an input unit as a function of at least one criterion. A check is made to determine whether the at least one criterion is satisfied. The at least one limiting value is activated if the at least one criterion is satisfied.

10 Claims, 4 Drawing Sheets

METHOD AND DEVICE FOR OPERATING A VEHICLE

BACKGROUND INFORMATION

Limiting a performance quantity of a vehicle, in particular the speed or engine speed, to a predefined limiting value is known. Speed limiters, for example, are now used in the following situations: for maximum speed limitation, for limiting the speed in vehicles whose center of gravity may vary due to an air suspension, for variable speed limitation, which is set and activated by the driver via an operating element.

SUMMARY OF THE INVENTION

The method according to the present invention and the device according to the present invention for operating a vehicle have the advantage over the related art that the at least one limiting value is predefined at an input unit as a function of at least one criterion; it is checked whether the at least one criterion is satisfied; and the at least one limiting value is activated if the at least one criterion is satisfied. This makes it possible to extend the function of limiting the performance quantity of the vehicle, the speed limiting function in particular, in such a way that a more flexible configuration of the limiting function is implementable. This substantially increases the application possibilities of the limiting function.

It is particularly advantageous if an access authorization is selected as the at least one criterion, and if permission is granted for predefining the at least one limiting value only to a holder of a valid access authorization. This makes it possible to limit the maximum speed of the vehicle differently for different users, for example, the individual users having no access to the speed limitation if they have no access authorization. The vehicle's owner having corresponding access authorization, for example, may thus limit the maximum speed differently when allowing the vehicle to be driven by different users. For example, the owner of a sports car may place the vehicle at the disposal of other users with limitations in terms of the maximum possible speed. The maximum speed of a company car, for example, may also be limited for the individual users to prevent it from being overloaded.

A further advantage results if a user ID is selected as the at least one criterion. This permits the vehicle speed to be limited differently for different users as described above.

A further advantage results if a mileage of the vehicle is selected as the at least one criterion. This permits the speed or the engine speed of the vehicle to be limited, in particular when the vehicle or its engine is new, i.e., has covered less than 3000 km. The driver comfort is thus enhanced, because the driver does not need to pay attention to conditions that apply during run-in of the vehicle, i.e., in particular the condition that a predefined engine speed or vehicle speed must not be exceeded.

A further advantage results if an engine temperature or a variable derived therefrom is selected as the at least one criterion. This protects the vehicle's engine after starting if the engine is cold without the driver having to pay attention to the engine speed limit or the vehicle speed limit. The ride comfort is thus also enhanced.

It is furthermore advantageous if the limitation of the performance quantity is canceled via an appropriate input at the input unit. This provides the driver with the option of turning off the limitation function again, giving the limitation function maximum flexibility according to the driver's needs.

Another advantage results if the cancellation of the limitation is only allowed to the holder of a valid access authorization. This permits the group of users who are allowed to cancel the limitation function to be predefined, making it possible for users of the vehicle to be prevented from canceling the limitation function.

A further advantage results if the at least one criterion is encoded in a vehicle key. This permits a speed or engine speed profile to be predefined and encoded in the vehicle key for the particular vehicle user who has the vehicle key, so that the appropriate profile is activated when the vehicle key is inserted into the vehicle lock or the ignition lock. This also represents a convenient approach, which requires no additional action from the driver.

A further advantage results if a variation of the at least one limiting value is allowed within a predefined range at the input unit as a function of a user ID. This allows the at least one limiting value to be varied within predefined limits for individual users who have no access authorization, so that the scope of function of the limiting function is also increased for these users.

DETAILED DESCRIPTION

Figure 1:
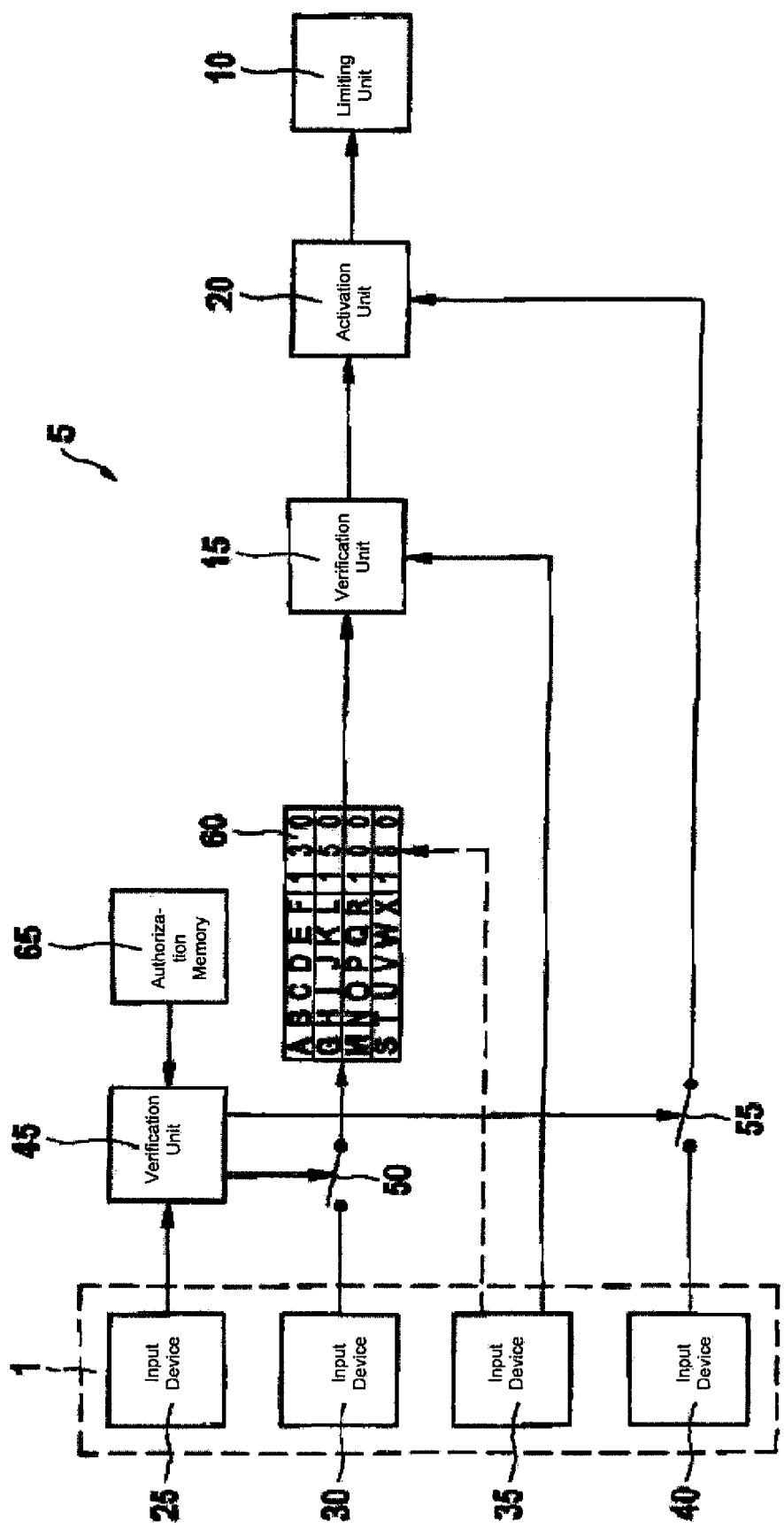
FIG. 1 shows a functional diagram for explaining the method of the present invention and the device of the present invention according to a first exemplary embodiment.

In FIG. 1, a device according to the present invention for limiting a vehicle performance quantity, in this case the vehicle speed, is labeled as 5. Device 5 includes an input unit 1 having a first input device 25, a second input device 30, a third input device 35, and a fourth input device 40. The four input devices 25, 30, 35, 40 may be formed by a single alphanumeric keyboard, for example, and are illustrated in FIG. 1 separately only for the purposes of the explanation. First input device 25 and third input device 35 may also be card slots or a single card slot for insertion of an access authorization card and/or a user ID card. A second verification unit 45, which is also connected to an access authorization memory 65 and triggers a first switch 50, is connected to first input device 25. Second input device 30 is connectable to a predefinition memory 60 via first switch 50; predefinition memory 60 is in turn connected to a first verification unit 15. First verification unit 15 may also receive input made at third input unit device 35. The output of first verification unit 15 is also connected to activation means, i.e., an activation unit 20, which may receive input from fourth input device 40 via a second controlled switch 55, which is also triggered by second verification unit 45. The output of activation unit 20 is connected to a limiting unit 10 for limiting the performance quantity of the vehicle. This limiting unit 10, in the present example, is a vehicle speed limiting unit, which may be situated in an engine controller (not illustrated in FIG. 1) of the vehicle. Except for input unit 1, device 5 may also be implemented as software and/or hardware in the engine controller.

In the following, it will be assumed, for example, that the vehicle is used by five individuals. A first individual is, for example, the vehicle owner and has an access authorization card or an access authorization code. The vehicle owner may identify himself via first input device 25 by inserting the access authorization card into the corresponding card slot or entering his access authorization code via the keyboard of input unit 1. First input device 25 in FIG. 1 is thus used to synchronize the input activity for determining access authorization. The access authorization data stored on the access authorization card or the access authorization code is compared to the corresponding data from access authorization memory 65 in second verification unit 45. Access authorization data for one or more individuals having access authorization may be stored in access authorization memory 65. If identical access authorization data or an identical access authorization code is determined in the comparison, second verification unit 45 causes first controlled switch 50 to connect second input device 30 to predefinition memory 60. In other words, the keyboard of input unit 1 is enabled for programming predefinition memory 60. This programming may be displayed, for example, on a display device not shown in FIG. 1 for checking and correcting. A limiting value for the maximum speed may be predefined in predefinition memory 60 for each user of the vehicle if there is sufficient memory space.

In the example described, a first limiting value of 130 km/h is predefined for a first user ABCDEF; a second limiting value of 150 km/h is predefined for a second user GHIJKL; a third limiting value of 100 km/h is predefined for a third user MNOPQR, and a fourth limiting value of 180 km/h is predefined for a fourth user STUVWX. Further users who are different from the above users, or the vehicle owner himself, may not be assigned any effective speed limitation, so that the maximum speed for these users is only limited by the engine's power.

All users of the vehicle must identify themselves before driving off. This is accomplished via third input device 35. Identification may take place, for example, via a user code to be entered at the keyboard of input unit 1, via a user ID card to be inserted into a card slot, or by inserting the vehicle key into the vehicle lock or the ignition lock. In the case of the user ID card or vehicle key, the user ID is permanently stored, i.e., encoded, in the user ID card or vehicle key. In programming predefinition memory 60, the user ID associated with the corresponding limiting value may also be predefined, for example, by entering the user code on the keyboard of input unit 1, by inserting the user ID card into the card slot, or by inserting the vehicle key of the respective user into a vehicle lock or ignition lock, second input device 30, which may thus also include a shared card slot or a vehicle lock or an ignition lock, for example, in addition to the keyboard for at least the input of the corresponding limiting value, being symbolically provided for this purpose in FIG. 1.

The user ID input via third input device 35 is then compared in first verification unit 15 with the user IDs stored in predefinition memory 60. If the user ID of the user wishing to use the vehicle, input at third input device 35 for the purpose of identification, matches a user ID stored in predefinition memory 60, first verification unit 15 outputs the corresponding limiting value and causes activation unit 20 to forward this limiting value to limiting unit 10 and to activate limiting unit 10 so that the associated limiting value is observed and not exceeded by the vehicle speed. The user of the vehicle may then request the cancellation of the limit on the performance quantity, in this example, on the vehicle speed, via an input at fourth input device 40. Fourth input device 40 then causes activation unit 20 to deactivate the limiting value for the vehicle speed in effect for the user of the vehicle and cause limiting unit 10 to cancel this limiting value accordingly if second switch 55 is closed. Second switch 55 is closed only if so instructed by second verification unit 45, i.e., if a valid access authorization has been entered at first input device 25. A limiting value for the vehicle speed in this example may thus be canceled only if it is enabled by an individual having appropriate access authorization via first input device 25. The input at fourth input device 40 may also take place via the keyboard of input unit 1. The access authorization may also be encoded in a vehicle key; first input device 25 may also include a vehicle lock or an ignition lock in this case.

A user of the vehicle, whose user ID has been positively established in first verification unit 15, may also vary the limiting value, predefined for this user, within a predefined range at third input device 35 as shown by the dashed arrow in FIG. 1. This predefined range may be formed, for example, by the user being able to program any possible limiting value for the maximum speed associated with his user ID in predefinition memory 60, as long as this limiting value does not exceed the limiting value originally input via second input device 30 by the individual having access authorization. Thus, for example, the user having user ID ABCDEF may program any limiting value that is less than or equal to 130 km/h, assigned to his user ID, in predefinition memory 60. User IDs not assigned to any limiting value may also have been stored in predefinition memory 60 by the individual having access authorization. If such a user ID is detected in first verification unit 15 after appropriate input of a user at third input device 35, this user himself may predefine a limiting value for his user ID at third input device 35, according to dashed arrow in FIG. 1; this limiting value associated to the user ID is then stored in predefinition memory 60 and is activatable as described above. An enable bit may also be stored in predefinition memory 60 by the individual having access authorization for any user ID, allowing the respective user to freely program or modify this limiting value irrespective of a limiting value assigned to this user ID by the individual having access authorization. The individual having access authorization may also assign in predefinition memory 60 defined ranges to different user IDs within which ranges the respective user may vary the limiting value.

In an alternative embodiment to the first exemplary embodiment described above, the individual having access authorization may also predefine a uniform limiting value for the maximum speed for all users, for example, in the case of a company car, via second input device 30, this limiting value applying regardless of the user ID and being activated via activation unit 20 at limiting unit 10 via the predefinition of the uniform limiting value by the individual having access authorization positively identified by second verification unit 45; in this case, first verification unit 15 and third input device 35 are not needed.

Figure 2:
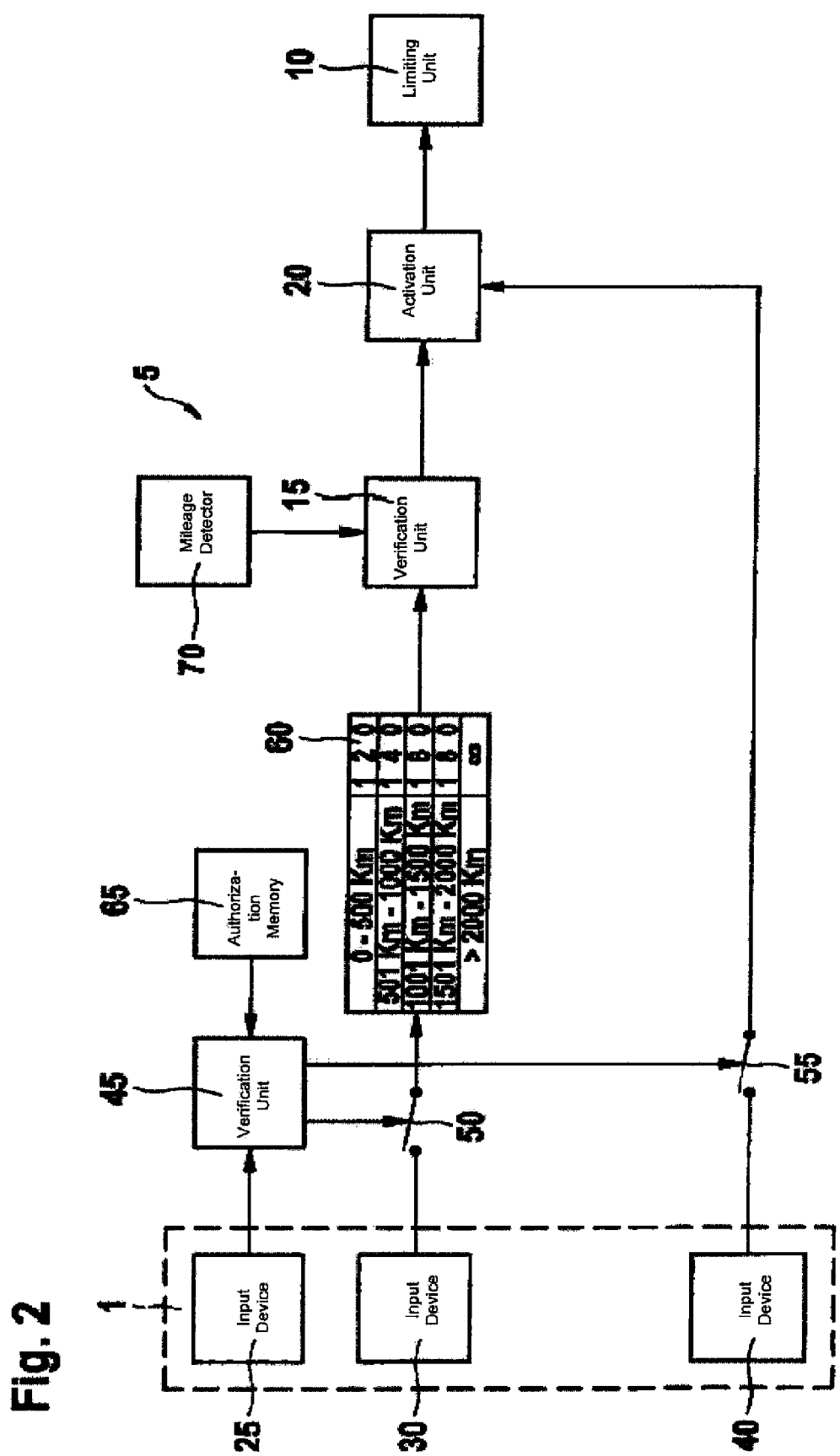
FIG. 2 shows a functional diagram for explaining the method of the present invention and the device of the present invention according to a second exemplary embodiment.

FIG. 2 shows a functional diagram for a second exemplary embodiment of the present invention, which has essentially the same design as the functional diagram of FIG. 1 and in which the same reference symbols denote the same elements as in FIG. 1. In contrast with the functional diagram of FIG. 1, in the second exemplary embodiment of FIG. 2, third input device 35 is not provided. Instead, a mileage detector 70, in the form of an odometer or a mileage counter, for example, is connected to first verification unit 15; mileage detector 70 detects the mileage traveled by the vehicle since its first startup and forwards this mileage to first verification unit 15. Furthermore, in the second embodiment the individual having access authorization may predefine different limiting values for the maximum vehicle speed for different vehicle mileage ranges at second input device 30 if he has been positively identified in second verification unit 45 as the individual having access authorization in the manner described above. According to the example of FIG. 2, he initially inputs a first mileage range of 0 to 500 kilometers in predefinition memory 60 and assigns this range a first limiting value for the maximum speed of 120 km/h in predefinition memory 60. Subsequently he programs a second mileage range of 501 to 1000 kilometers in predefinition memory 60 and assigns it a second limiting value for the maximum speed of 140 km/h in predefinition memory 60. Subsequently he programs a third mileage range from 1001 to 1500 kilometers in predefinition memory 60 and assigns it a third limiting value for the maximum speed of 160 km/h in predefinition memory 60. Subsequently he programs a fourth mileage range from 1501 to 2000 kilometers in predefinition memory 60 and assigns it a fourth limiting value for the maximum speed of 180 km/h in predefinition memory 60. Subsequently he programs a fifth mileage range of over 2000 kilometers in predefinition memory 60 and assigns it a fifth limiting value for the maximum speed of infinity, i.e., no limitation, in predefinition memory 60. The maximum speed in the fifth mileage range of the vehicle is thus only limited by the vehicle engine power.

The instantaneous mileage detected by mileage detector 70 is then evaluated in first verification unit 15 and checked to determine within which of the five mileage ranges stored in predefinition memory 60 the instantaneous mileage falls. First verification unit 15 then outputs the limiting value assigned to the corresponding mileage range and forwards it to activation unit 20, which then causes limiting unit 10 to receive and observe this limiting value, i.e., to activate it. This above-described limitation according to the second exemplary embodiment may also be canceled via fourth input device 40 as described for the first exemplary embodiment. Running-in a new vehicle is facilitated for the driver by the second exemplary embodiment, because typically full power may not initially be requested from a new vehicle. This is ensured automatically by the limitation without the driver having to pay attention to it. As an alternative to assigning a limiting value for the maximum vehicle speed to the corresponding mileage range of the vehicle, a limiting value for the engine speed may also be assigned to the corresponding mileage range of the vehicle.

Figure 3:
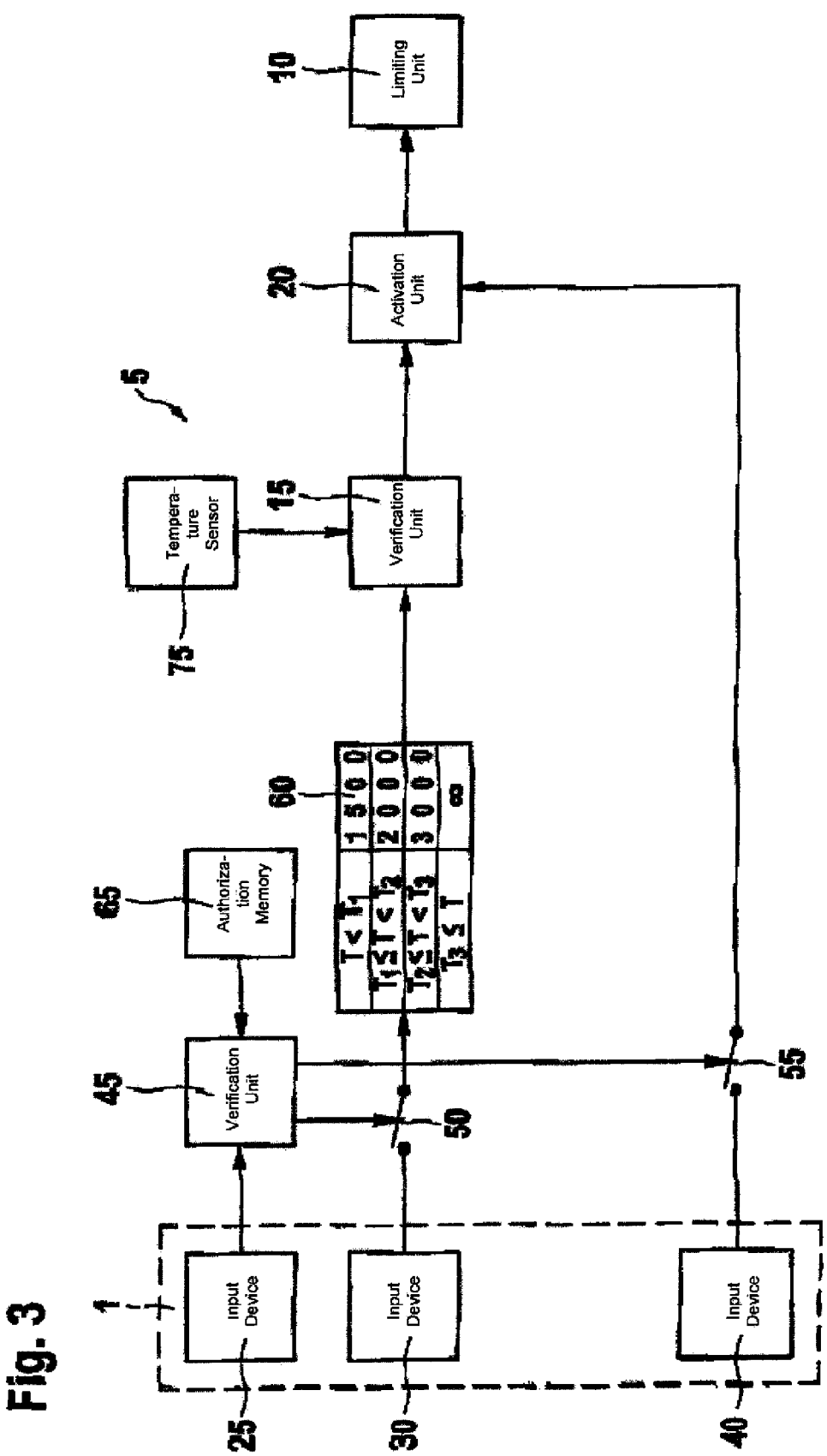
FIG. 3 shows a functional diagram for explaining the method of the present invention and the device of the present invention according to a third exemplary embodiment.

FIG. 3 shows a functional diagram for a third exemplary embodiment of the present invention, which has essentially the same design as the functional diagram of FIG. 2 and FIG. 1, and in which the same reference symbols denote the same elements as in FIG. 1 and FIG. 2. In contrast with the functional diagram of FIG. 1, in the third exemplary embodiment of FIG. 3, third input device 35 is not provided. Instead, a temperature sensor 75 is connected to first verification unit 15 for detecting engine temperature T; temperature sensor 75 detects engine temperature T and forwards it to first verification unit 15. Furthermore, in the third exemplary embodiment the individual having access authorization may predefine different limiting values for the engine speed of the vehicle for different engine temperature ranges at second input device 30 if he has been positively identified in second verification unit 45 as the individual having access authorization in the manner described above.

According to the example of FIG. 3, he initially inputs a first engine temperature range T below a first engine temperature T1 in predefinition memory 60 and assigns it a first limiting value for the engine speed of 1500 rpm in predefinition memory 60. Subsequently he programs a second engine temperature range for engine temperatures T greater than or equal to first engine temperature T1 and less than second engine temperature T2, which is greater than first engine temperature T1, in predefinition memory 60 and assigns this second engine temperature range a second limiting value for the engine speed of 2000 rpm in predefinition memory 60. Subsequently he programs a third engine temperature range for engine temperatures T greater than or equal to second engine temperature T2 and less than a third engine temperature T3, which is greater than second engine temperature T2, in predefinition memory 60 and assigns this second engine temperature range a third limiting value for the engine speed of 3000 rpm in predefinition memory 60. Subsequently he programs a fourth engine temperature range for engine temperatures T greater than or equal to third engine temperature T3 in predefinition memory 60 and assigns it a fourth limiting value for the engine speed of infinity, i.e., no limitation, in predefinition memory 60. The maximum engine speed in the fourth engine temperature range of the vehicle is thus only limited by the vehicle engine power.

The instantaneous oil temperature or, in this example, engine temperature detected by temperature sensor 75, is then evaluated in first verification unit 15 and checked to determine within which of the four engine temperature ranges stored in predefinition memory 60 the instantaneous engine temperature T falls. First verification unit 15 then outputs the limiting value assigned to the corresponding engine temperature range and forwards it to activation unit 20, which then causes limiting unit 10 to receive and observe this limiting value, i.e., to activate it. This above-described limitation according to the third exemplary embodiment may also be canceled via fourth input device 40 as described for the first exemplary embodiment. Engine temperature T may be determined, for example, on the basis of the engine oil temperature or the coolant temperature or on the basis of a variable otherwise derived from engine temperature T as known by those skilled in the art. The third exemplary embodiment makes it possible to facilitate driving the vehicle for the driver shortly after a start with a cold engine, because in this case the full driving performance should not be requested in order to reduce exhaust gas emissions and not to overload the engine. This is ensured automatically by the limitation without the driver having to pay attention to it. In particular, in this third exemplary embodiment, it may be provided that any user be allowed to cancel an instantaneous limitation of the engine speed via fourth input device 40 without being authorized by an individual having access authorization. In this case, second switch 55 would be replaced by a closed connection. Should the user, i.e., the driver of the vehicle, not wish to have the limitation function for engine temperature, he may turn it off as described above.

It is furthermore possible to combine a plurality of or all above-mentioned criteria and have the corresponding combination ranges programmed in predefinition memory 60 by the individual having access authorization positively identified as such by second verification unit 45 and a limiting value assigned for the performance quantity of the vehicle, for example, the maximum speed, to each of these combination ranges. According to a fourth exemplary embodiment according to FIG. 4, the criteria of user ID and mileage of the vehicle are linked to form combination ranges. The functional diagram of FIG. 4 has essentially the same design as the functional diagram of FIG. 1 with the difference that in addition to the elements of the functional diagram of FIG. 1, a mileage detector 70, connected to first verification unit 15 as in the functional diagram of FIG. 2, is provided in the functional diagram of FIG. 4. Otherwise the same reference symbols denote the same elements in FIG. 1 and FIG. 4.

Figure 4:
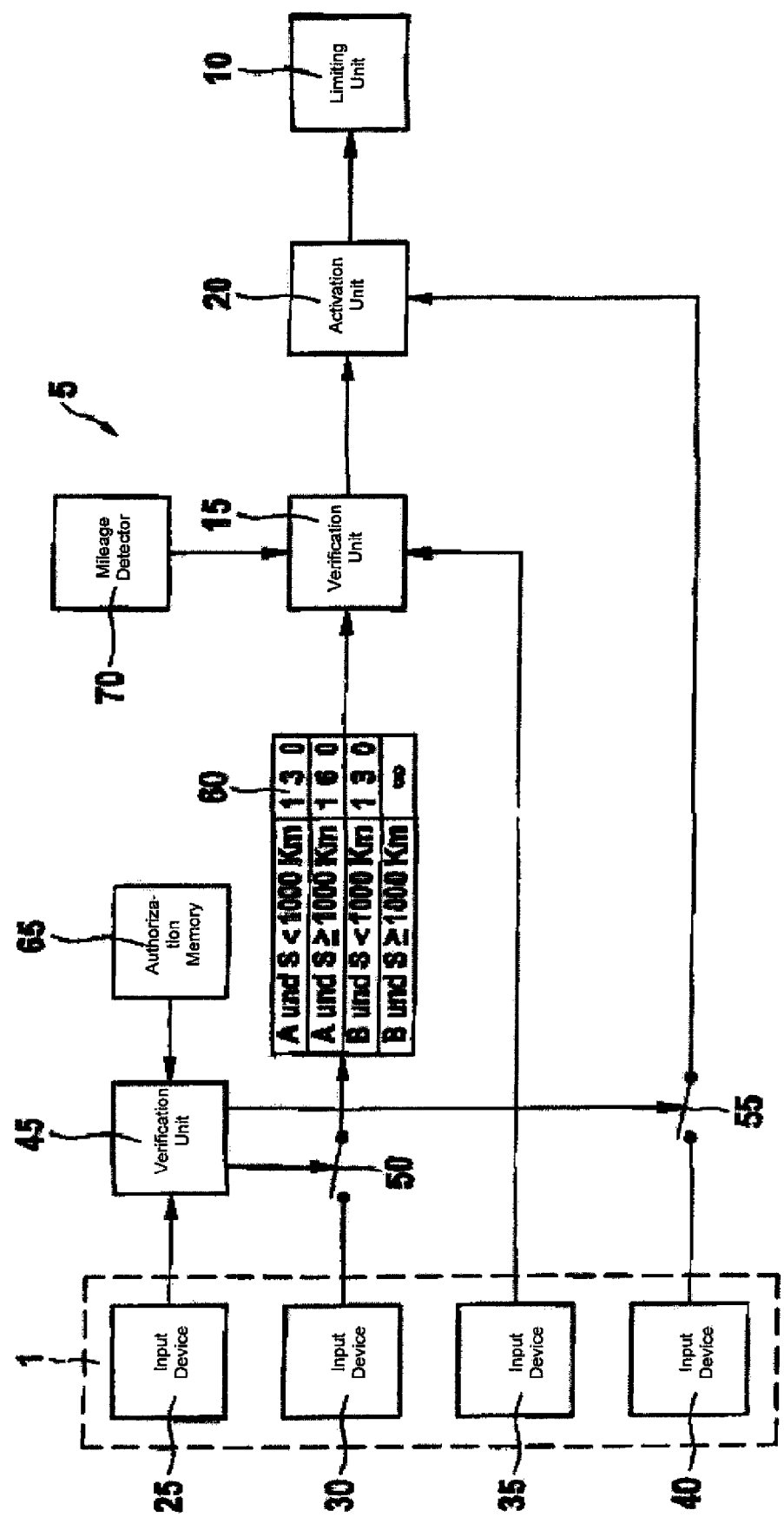
FIG. 4 shows a functional diagram for explaining the method of the present invention and the device of the present invention according to a fourth exemplary embodiment.

According to the example of FIG. 4, the individual having access authorization programs predefinition memory 60 as follows: a first combination range, characterized by user ID A and a mileage s of less than 1000 km, is configured by the individual having access authorization. The individual having access authorization assigns the first combination range a first limiting value for the maximum vehicle speed of 130 km/h in predefinition memory 60. A second combination range, characterized by user ID A and a mileage s of equal to or greater than 1000 km, is configured by the individual having access authorization. The individual having access authorization assigns the second combination range a second limiting value for the maximum vehicle speed of 160 km/h in predefinition memory 60. A third combination range, characterized by user ID B and a mileage s of less than 1000 km, is configured by the individual having access authorization. The individual having access authorization assigns the third combination range a third limiting value for the maximum vehicle speed of 130 km/h in predefinition memory 60. A fourth combination range, characterized by user ID B and a mileage s of equal to or greater than 1000 km, is configured by the individual having access authorization. The individual having access authorization assigns the fourth combination range a fourth limiting value for the maximum vehicle speed of infinity, i.e., no limitation, in predefinition memory 60. Thus, if user identity A is detected in first verification unit 15 on the basis of an appropriate input at third input device 35 and an instantaneous mileage s of the vehicle is detected by mileage detector 70 in first verification unit 15 to be less than 1000 km, first verification unit 15 determines that all criteria for the first combination range are present.

First verification unit 15 then outputs the first limiting value assigned to the first combination range for the maximum vehicle speed of 130 km/h and forwards this value to activation unit 20 for implementation and activation in limitation unit 10, so that the first limiting value may not be exceeded by the vehicle speed. If user identity A is detected in first verification unit 15 on the basis of an appropriate input at third input device 35 and an instantaneous mileage s of the vehicle is detected by mileage detector 70 in first verification unit 15 to be equal to or greater than 1000 km, first verification unit 15 determines that all criteria for the second combination range are present. First verification unit 15 then outputs the second limiting value assigned to the second combination range for the maximum vehicle speed of 160 km/h and forwards this value to activation unit 20 for implementation and activation in limitation unit 10, so that the second limiting value may not be exceeded by the vehicle speed.

If user identity B is detected in first verification unit 15 on the basis of an appropriate input at third input device 35 and an instantaneous mileage s of the vehicle is detected by mileage detector 70 in first verification unit 15 to be less than 1000 km, first verification unit 15 determines that all criteria for the third combination range are present. First verification unit 15 then outputs the third limiting value assigned to the third combination range for the maximum vehicle speed of 130 km/h and forwards this value to activation unit 20 for implementation and activation in limitation unit 10, so that the third limiting value may not be exceeded by the vehicle speed. If user identity B is detected in first verification unit 15 on the basis of an appropriate input at third input device 35 and an instantaneous mileage s of the vehicle is detected by mileage detector 70 in first verification unit 15 to be equal to or greater than 1000 km, first verification unit 15 determines that all criteria for the fourth combination range are present. First verification unit 15 then outputs the fourth limiting value assigned to the fourth combination range for the maximum vehicle speed of infinity and forwards this value to activation unit 20 for implementation and activation in limitation unit 10, so that the fourth limiting value may not be exceeded by the vehicle speed. The fourth limiting value represents no limitation; therefore, if the fourth combination range is detected, no limitation is to be activated by limiting unit 10. If first verification unit 15 detects a user ID which is different from the user IDs stored in predefinition memory 60, none of the combination ranges programmed in predefinition memory 60 is detected in first verification unit 15, and thus no limitation is activated. This limitation described according to the fourth exemplary embodiment may be canceled via fourth input device 40 as described for the first exemplary embodiment.

Any performance quantity of the vehicle, such as an engine torque, engine output, a cylinder filling, etc., may also be selected as a vehicle performance quantity to be limited.

What is claimed is:

1. A method for operating a vehicle, comprising:
   limiting a performance quantity of the vehicle, the performance quantity being one of speed and engine speed;
   predefining at least one limiting value for the performance quantity at an input unit of the vehicle as a function of a first criterion;
   selecting an access authorization as the first criterion;
   granting permission for predefining the at least one limiting value only to a holder of a valid access authorization;
   checking whether a second criterion is satisfied;
   activating the at least one limiting value if the second criterion is satisfied; and
   allowing a plurality of users to vary the at least one limiting value within a predefined range, at the input unit, as a function of a user ID associated with each user.

2. The method according to claim 1, further comprising selecting the user ID as the second criterion.

3. The method according to claim 1, further comprising selecting a mileage as the second criterion.

4. The method according to claim 1, further comprising selecting a mileage reading of the vehicle as the second criterion.

5. The method according to claim 1, further comprising selecting an engine temperature as the second criterion.

6. The method according to claim 1, further comprising selecting a variable derived from an engine temperature as the second criterion.

7. The method according to claim 1, further comprising canceling the limitation of the performance quantity via an appropriate input at the input unit.

8. The method according to claim 7, wherein the cancellation of the limitation is only allowed to a holder of a valid access authorization.

9. The method according to claim 1, comprising encoding the second criterion in a vehicle key.

10. A device for operating a vehicle comprising:
- means for limiting a performance quantity of the vehicle, the performance quantity being one of speed and engine speed;
- an input unit at which at least one limiting value for the performance quantity is predefinable as function of a first criterion, the first criterion being an access authorization, wherein permission is granted for predefining the at least one limiting value only to a holder of a valid access authorization;
- a verification unit checking whether a second criterion is satisfied; and
- means for activating the at least one limiting value if the second criterion is satisfied, wherein a plurality of users are allowed to vary the at least one limiting value within a predefined range, at the input unit, as a function of a user ID associated with each user.

* * * * *